US011907748B2

United States Patent
Banack et al.

(10) Patent No.: US 11,907,748 B2
(45) Date of Patent: Feb. 20, 2024

(54) SECURE GRAPHICS PROCESSING UNIT (GPU) VIRTUALIZATION USING SANDBOXING

(71) Applicant: VMware LLC, Palo Alto, CA (US)

(72) Inventors: Michael Banack, Mountain View, CA (US); Mark Sheldon, Fremont, CA (US)

(73) Assignee: VMware LLC, Palo Alto, CA (US)

( * ) Notice: Subject to any disclaimer, the term of this patent is extended or adjusted under 35 U.S.C. 154(b) by 385 days.

(21) Appl. No.: 17/239,443

(22) Filed: Apr. 23, 2021

(65) Prior Publication Data

US 2022/0342687 A1 Oct. 27, 2022

(51) Int. Cl.
*G06F 9/455* (2018.01)
*G06F 9/54* (2006.01)
*G06T 1/20* (2006.01)

(52) U.S. Cl.
CPC .......... *G06F 9/45558* (2013.01); *G06F 9/547* (2013.01); *G06T 1/20* (2013.01); *G06F 2009/45579* (2013.01)

(58) Field of Classification Search
CPC ............... G06F 9/45558; G06F 9/547; G06F 2009/45579; G06T 1/20
See application file for complete search history.

(56) References Cited

U.S. PATENT DOCUMENTS

| 2010/0131944 A1* | 5/2010 | Iorio | ............ G06F 9/4856 718/1 |
| 2011/0022643 A1* | 1/2011 | Jalon | ............ H04N 21/8193 707/E17.014 |
| 2015/0049096 A1* | 2/2015 | Nataros | ............ G06T 1/20 345/506 |

\* cited by examiner

*Primary Examiner* — Wissam Rashid
(74) *Attorney, Agent, or Firm* — Quarles & Brady LLP

(57) ABSTRACT

Techniques for implementing secure GPU virtualization using sandboxing are provided. In one set of embodiments, a hypervisor of a host system can receive one or more first graphics/compute commands issued by a guest application running within a VM of the host system. The hypervisor can further communicate the one or more first graphics/compute commands to a sandboxed software process that is separate from the hypervisor. The sandboxed software process can then translate the one or more first graphics/compute commands into one or more second graphics/compute commands and issue the one or more second graphics/compute commands for execution on a physical GPU.

21 Claims, 4 Drawing Sheets

SECURE GRAPHICS PROCESSING UNIT (GPU) VIRTUALIZATION USING SANDBOXING

BACKGROUND

Unless otherwise indicated, the subject matter described in this section is not prior art to the claims of the present application and is not admitted as being prior art by inclusion in this section.

In modern computer systems, graphics processing units (GPUs) are commonly used to accelerate graphics and compute workloads such as three-dimensional (3D) graphics rendering, image and video processing, machine learning, and so on. GPU virtualization is a technology that allows a physical GPU to accelerate the graphics and compute workloads of guest applications running within virtual machines (VMs).

According to one GPU virtualization approach, a hypervisor of a host system comprising a physical GPU can implement a software-based virtual GPU and present this virtual GPU as a physical GPU device to a VM. A guest application of the VM can issue graphics/compute commands to the virtual GPU (in the form of, e.g., calls to a guest graphics/compute application programming interface (API) library) and the virtual GPU can pass the commands to a virtual rendering component, referred to herein as a "rendering backend," of the hypervisor. The rendering backend can then translate the guest graphics/compute commands into corresponding host graphics/compute commands (such as, e.g., calls to a host graphics/compute API library) that enable the commands to be understood by the host operating system (OS) and executed on the host system's physical GPU.

However, a significant issue with this approach is that, due to its guest command processing, the hypervisor's rendering backend is susceptible to attacks by malicious guest code. For example, a malicious guest application may issue a sequence of graphics/compute commands that exploit a vulnerability in the rendering backend and allow the guest application to read the rendering backend's memory, cause the rendering backend to execute arbitrary instructions, or the like. Because the rendering backend typically runs as a thread of the hypervisor process (which is granted elevated system privileges in order to carry out its virtualization functions), this type of attack can lead to a breakdown in the security of the entire host system.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

The present disclosure is directed to techniques for implementing secure GPU virtualization using sandboxing. As known in the art, sandboxing is a software management strategy that isolates a software process from critical system resources and from other software processes in order to prevent an attack on the software process from spreading beyond the scope of that process. A software process that is isolated in this manner is known as a sandboxed process.

At a high level, the techniques of the present disclosure involve running the rendering backend of a hypervisor (i.e., the component that synthesizes host graphics/compute commands from guest graphics/compute commands) as a sandboxed process that is separate from the hypervisor process, rather than as a part (e.g., thread) of the hypervisor process. For example, in one set of embodiments the rendering backend can be run as a separate user level process that has a significantly reduced and/or restricted set of privileges (e.g., no file system access, no network access, no process spawning, etc.). In other embodiments, the rendering backend can be run within a dedicated VM or container, either on the same host system or on a remote host system.

With this general scheme, if malicious guest code compromises the rendering backend via a vulnerability in its guest command processing, that security breach will be limited to the rendering backend itself due to its sandboxed state and cannot be leveraged into a broader attack on the hypervisor or any other host process. Accordingly, the security concerns arising out of using a GPU virtualization approach that relies on this type of component can be largely mitigated/avoided.

2. Example Host System and Solution Architecture

Figure 1:
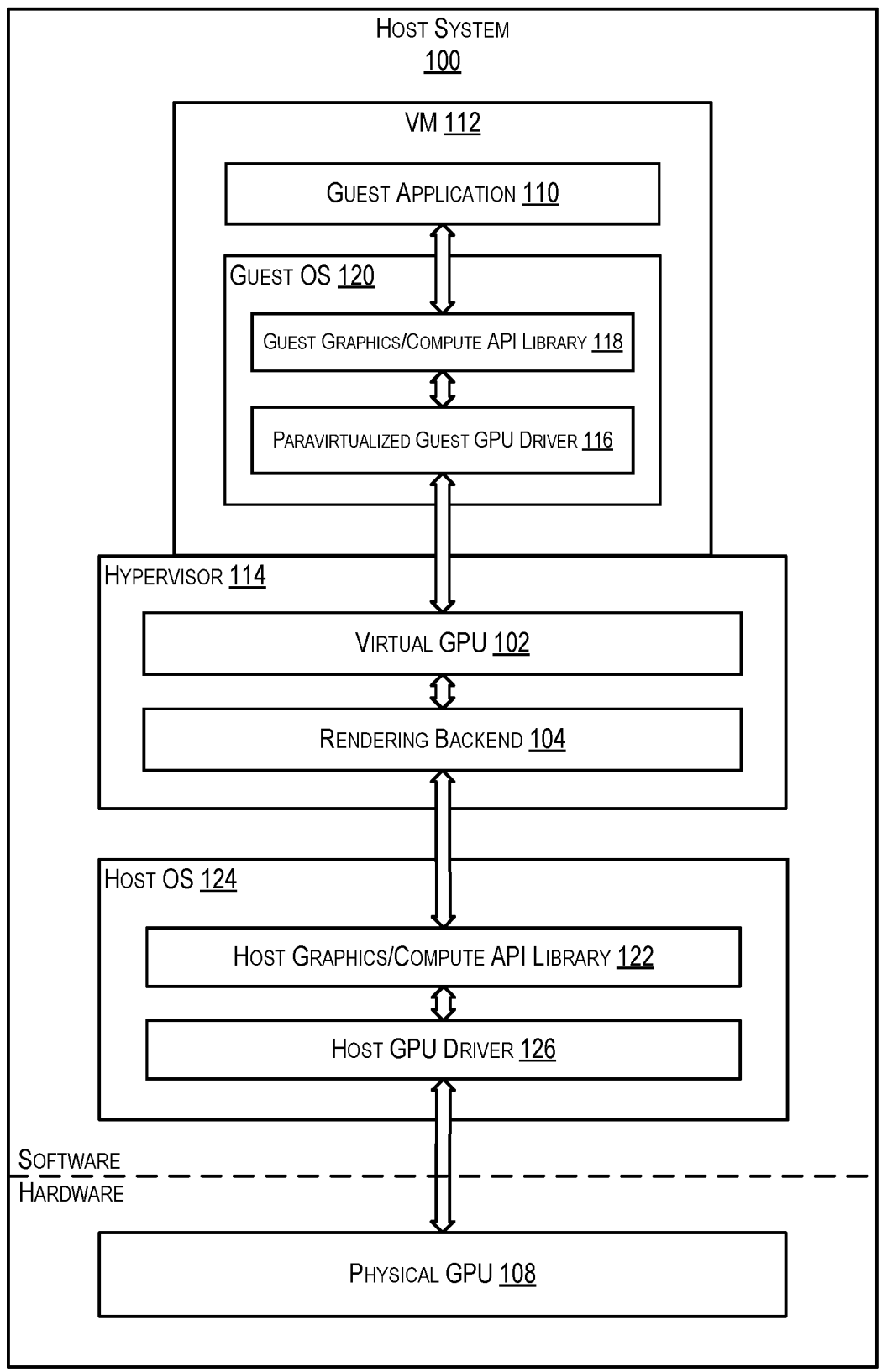
FIG. 1 depicts an example host system.

FIG. 1 is a simplified block diagram of an example host system 100 that implements GPU virtualization via a hypervisor-level virtual GPU 102 and rendering backend 104, thereby enabling a physical GPU 108 of host system 100 to accelerate the graphics/compute workload of a guest application 110 running within a VM 112. Physical GPU 108 is a specialized hardware processor (with associated memory known as video RAM or VRAM) that is designed to efficiently carry out calculations needed for 3D graphics rendering and other highly parallel computation tasks. Virtual GPU 102 is an emulated GPU device that is presented to VM 112 via the host system's hypervisor 114 and is designed to expose some, or all, of the functionality of physical GPU 108 to VM 112 via a paravirtualized guest GPU driver 116.

In operation, guest application 110—which may be a video game, computer-aided design (CAD) tool, image/video processing program, or any other type of application that supports GPU acceleration—issues guest graphics/compute commands to virtual GPU 102 by invoking APIs that are part of a guest graphics/compute API library 118 of a guest OS 120 of VM 112. Guest graphics/compute API library 118 may be, e.g., Direct3D, OpenGL, Vulkan, OpenCL, or any other graphics/compute API library known in the art.

Paravirtualized guest GPU driver 116 (which includes an implementation of guest graphics/compute API library 118) handles the API calls made by guest application 110 and forwards the calls, either in their original format or a modified format, to virtual GPU 102. Virtual GPU 102 then dispatches the calls in a synchronous fashion to rendering backend 104.

Upon receiving the guest API calls from virtual GPU 102, rendering backend 104 translates the received calls into corresponding calls to a host graphics/compute API library 122 of a host OS 124 of host system 100. Through this translation, rendering backend 104 ensures that the guest graphics/compute commands embodied by the guest API calls can be understood by host OS 124, even if guest graphics/compute API library 118 of guest OS 120 is different from host graphics/compute API library 122 of host OS 124. As part of the translation process, rendering backend 104 may parse shader programs provided by guest application 110 via the guest API calls and perform other types of processing on guest-provided data/parameters.

Finally, rendering backend 104 invokes the translated host API calls, which causes a host GPU driver 126 that implements host graphics/compute API library 122 to handle the calls and execute them on physical GPU 108. If there is any data to be returned to guest application 110 from physical GPU 108 as a result of executing the translated host API calls, that data is returned via a reverse path through host GPU driver 126, rendering backend 104, virtual GPU 102, and paravirtualized guest GPU driver 116.

As noted in the Background section, one issue with the GPU virtualization approach shown in FIG. 1 is that rendering backend 104 is susceptible to attacks by guest application 110 by virtue of the rendering backend's guest command processing and translation. For example, assume rendering backend 104 has a bug in its shader program parser that causes the parser to corrupt/overwrite a function pointer used by rendering backend 104 upon parsing a specific set of shader instructions. If guest application 110 is malicious, it may exploit this vulnerability by submitting the required set of shader instructions via one or more guest API calls and overwriting the function pointer to, e.g., leak data to guest application 110 or cause rendering backend 104 to execute arbitrary code. This is particularly problematic because rendering backend 104 is typically run as a thread of hypervisor 114's software process, which means that such an attack would allow guest application 110 to attain the same elevated privileges as hypervisor 114, potentially leading to a complete compromise of host system 100.

Figure 2:
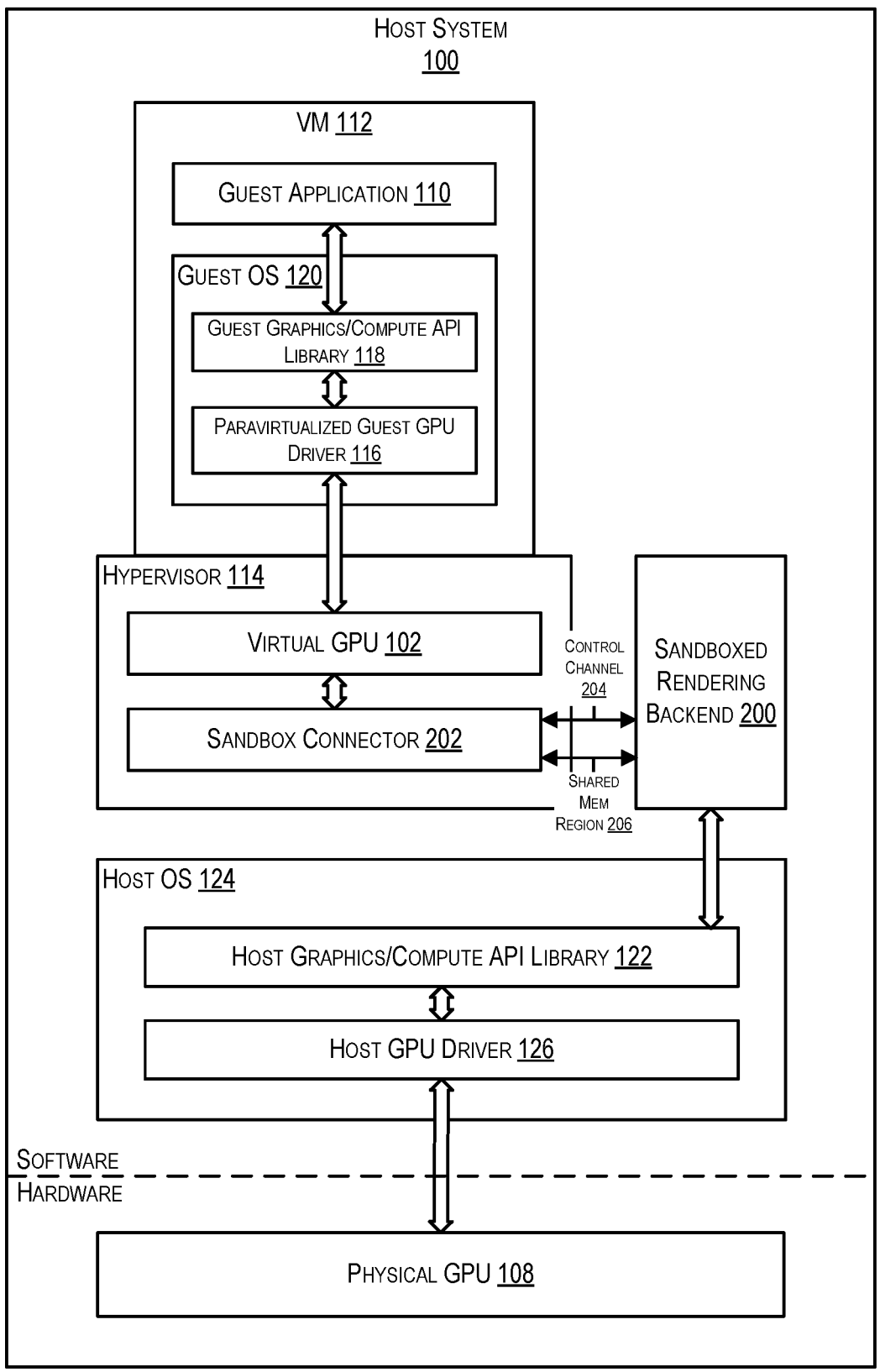
FIG. 2 depicts an enhanced version of the host system of FIG. 1 according to certain embodiments.

To address the foregoing and other similar concerns, FIG. 2 depicts an enhanced version of host system 100 that includes two new components: a sandboxed rendering backend 200 and a sandbox connector 202. Sandboxed rendering backend 200 is functionally similar to rendering backend 104 of FIG. 1 but is run as a user level software process that is separate/isolated from the software process of hypervisor 114 (as well as from all other software processes of host system 100). In addition, sandboxed rendering backend 200 is granted a minimal set of privileges that prevents backend 200 from freely accessing most resources of host system 100/host OS 124. For example, in a particular embodiment sandboxed rendering backend 200 cannot read or write files, cannot access network sockets, and cannot spawn new processes.

Sandbox connector 202 is a component of hypervisor 114 that enables asynchronous communication between hypervisor 114 and sandboxed rendering backend 200 via a control channel 204 and a shared memory region 206. An example workflow of the interaction between sandbox connector 202 and sandboxed rendering backend 200 for passing guest graphics/compute commands (e.g., guest API calls) from hypervisor 114 to backend 200 is detailed in section (3) below.

With the enhanced GPU virtualization architecture shown in FIG. 2, a number of advantages are achieved. First, because sandboxed rendering backend 200 is isolated from hypervisor 114, in the event that backend 200 is attacked and compromised by malicious guest code, such an attack will not affect hypervisor 114 or host system 100 as a whole; instead, it will be limited to the restrictive operating environment of sandboxed rendering backend 200. Accordingly, this architecture substantially reduces the severity and potential consequences of security vulnerabilities in sandboxed rendering backend 200, resulting in a more secure GPU virtualization solution.

Second, because sandboxed rendering backend 200 is run as its own, separate software process, in some cases the architecture shown in FIG. 2 can improve GPU virtualization performance by allowing host system 100 to process guest graphics/compute commands in a more parallel manner. For instance, with the approach of FIG. 1, rendering backend 104 and virtual GPU 102 must run on the same physical CPU core of host system 100 because they are both part of the software process of hypervisor 114. With the architecture of FIG. 2, sandboxed rendering backend 200 can be scheduled on a different physical CPU core than virtual GPU 102/hypervisor 114, leading to fewer processing bottlenecks and increased performance.

It should be appreciated that FIGS. 1 and 2 are illustrative and not intended to limit embodiments of the present disclosure. For example, although sandboxed rendering backend 200 is shown as being a sandboxed user level process that runs on top of host OS 124 of host system 100, in certain embodiments backend 200 may be implemented within a dedicated VM (referred to herein as a "driver VM") or container that runs on hypervisor 114 or the hypervisor of another, remote host system. By running sandboxed rendering backend 200 in such a dedicated VM/container, any attacks on the rendering backend can be effectively isolated from hypervisor 114 and other host processes on host system 100. Section (4) below provides additional details regarding this driver VM implementation.

Further, although only a single instance of sandboxed rendering backend 200 is depicted in FIG. 2, in certain embodiments multiple sandboxed rendering backends may be employed. For example, in a particular embodiment each guest application of VM 112 that is accelerated by physical GPU 108 may be assigned a separate sandboxed rendering backend for the purpose of translating the guest graphics/compute commands originating from that guest application.

Yet further, while foregoing description focuses on the notion of sandboxing the rendering backend of hypervisor 114 to enable secure GPU virtualization, the embodiments of the present disclosure are not strictly limited to the GPU virtualization context. Instead, they can be broadly applied to sandbox any type of hypervisor-level component that is involved in processing untrusted (e.g., guest-provided) commands and/or data, thereby preventing an attack on that component from spreading to the hypervisor or other host processes. One of ordinary skill in the art will recognize other variations, modifications, and alternatives.

3. Guest Command Processing Via Sandboxed Rendering Backend

Figure 3:
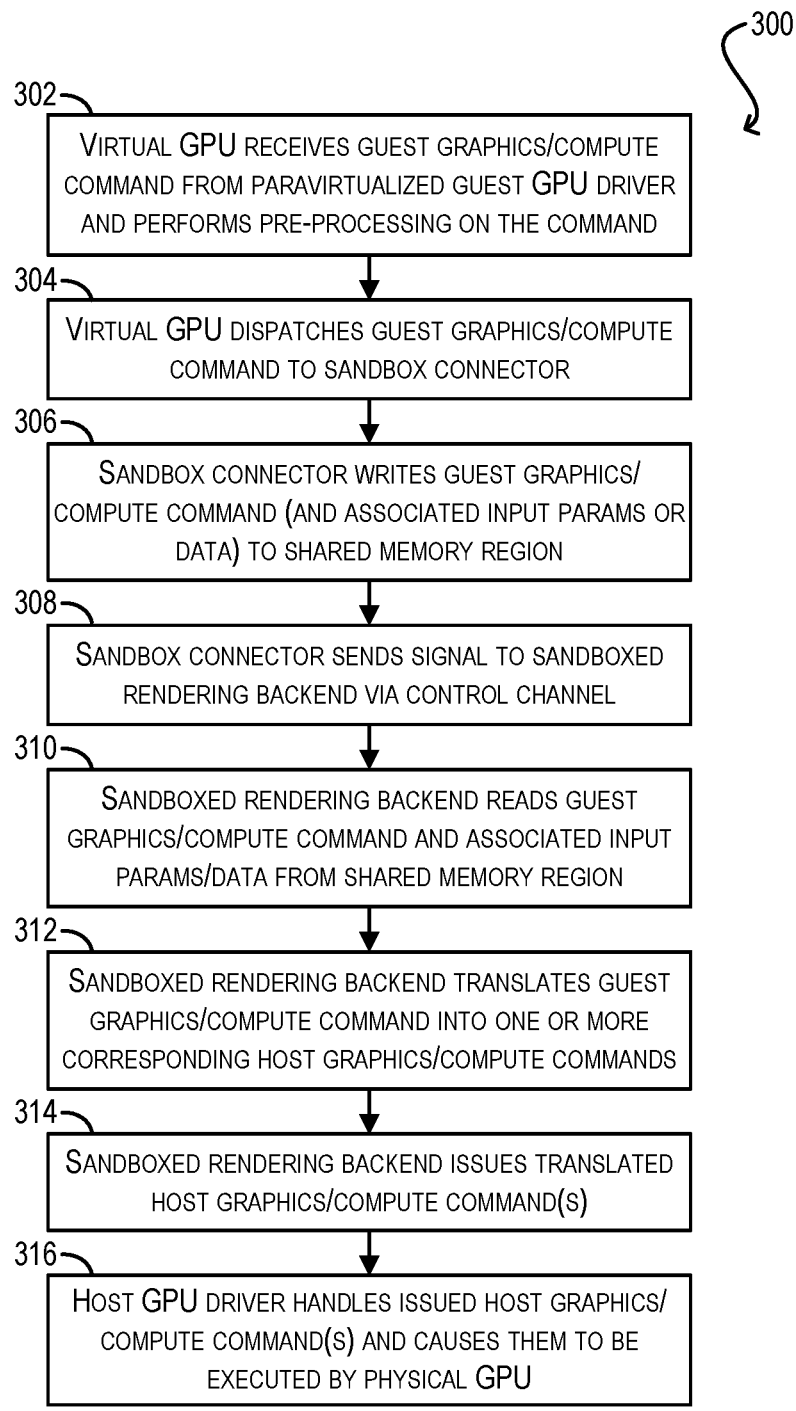
FIG. 3 depicts a guest command processing workflow according to certain embodiments.

FIG. 3 depicts a workflow 300 that may be executed by hypervisor 114 and sandboxed rendering backend 200 of FIG. 2 for processing a guest graphics/compute command issued by guest application 110 of VM 112 according to certain embodiments.

Starting with block 302, virtual GPU 102 of hypervisor 114 can receive (via, e.g., an asynchronous queue) the guest graphics/compute command from paravirtualized guest GPU driver 116 and perform one or more pre-processing steps on the command. These pre-processing steps can include, for example, sanitizing/validating input parameter(s) to the command and tracking any objects (e.g., surfaces, shaders, etc.) that are placed in the virtual VRAM of virtual GPU 102, or in other virtual memory accessible to virtual GPU 102, as part of the command.

At block 304, virtual GPU 102 can dispatch the guest graphics/compute command to sandbox connector 202. In response, sandbox connector 202 can write the command (as well as any associated input data/parameters) to shared memory region 206 (block 306) and send a signal to sandboxed rendering backend 200 via control channel 204 indicating that the shared memory region has command data to be consumed (block 308).

Upon receiving the signal via control channel 204, sandboxed rendering backend 200 can read the guest graphics/compute command and its associated input data/parameters from shared memory region 206 (block 310). Sandboxed rendering backend 200 can then translate the command into one or more corresponding host graphics/compute commands that are understood by host OS 124 of host system 100 (block 312) and issue the translated host command(s) (block 314). For example, as part of these blocks, sandboxed rendering backend 200 can translate the guest graphics/ command into one or more calls to host graphics/compute API library 122 and invoke the translated host API calls.

Finally, at block 316, host GPU driver 126 can handle the host graphics/compute command(s) issued by sandboxed rendering backend 200 and cause those commands to be executed by physical GPU 108 of host system 100.

4. Driver VM Implementation

Figure 4:
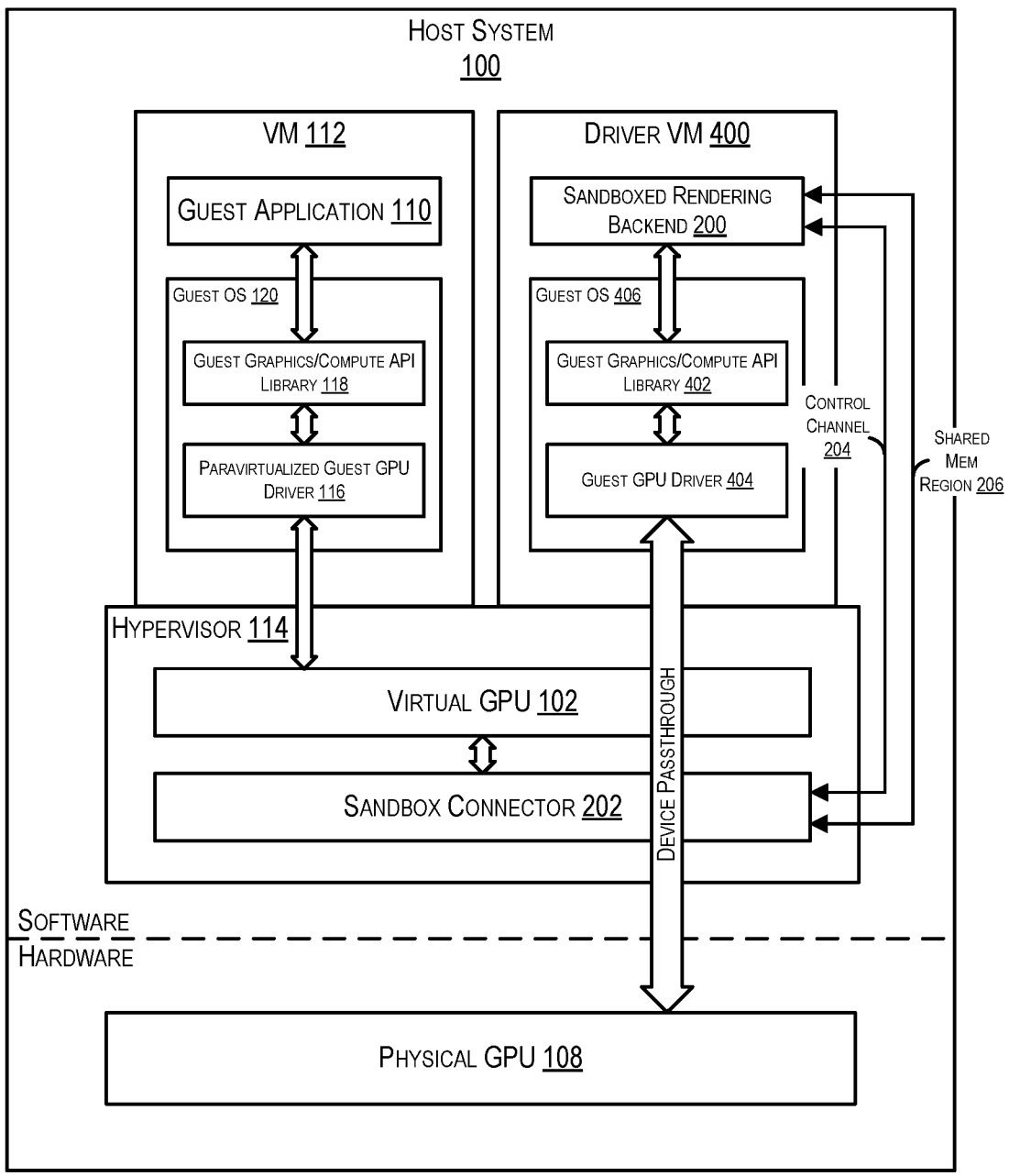
FIG. 4 depicts another enhanced version of the host system of FIG. 1 according to certain embodiments.

As mentioned previously, in certain embodiments sandboxed rendering backend 200 of FIG. 2 can be implemented within a dedicated VM (i.e., driver VM) rather than as a sandboxed user level process running on host OS 124. FIG. 4 depicts a version of host system 100 that uses this approach. As shown in FIG. 4, sandbox connector 202 of hypervisor 114 communicates (via control channel 206 and shared memory region 208) with an instance of sandboxed rendering backend 200 running within a driver VM 400. Sandboxed rendering backend 200 in turn communicates with a guest graphics/compute API library 402 and guest GPU driver 404 of guest OS 406 of driver VM 400, and guest GPU driver 404 directly accesses physical GPU 108 via a feature known as device passthrough (also referred to as PCI passthrough). In this figure, hypervisor 114 is a bare-metal hypervisor rather than a hosted hypervisor (as in FIGS. 1 and 2), which is a type of hypervisor that is installed directly on the hardware of a host system. In contrast, a hosted hypervisor is a type of hypervisor that is installed on top of a host OS (which as, e.g., host OS 124) of a host system.

The driver VM approach shown in FIG. 4 is useful in scenarios where hypervisor 114 is a bare-metal hypervisor because it does not require a host GPU driver for physical GPU 108 that has been specifically written to run on the hypervisor kernel; instead, this approach can leverage a guest GPU driver for physical GPU 108 that runs on guest OS 406 of driver VM 400 (e.g., Linux, Windows, etc.). In addition, because guest graphics/compute API library 402 and guest GPU driver 404—which are functionally analogous to host graphics/compute API library 122 and host GPU driver 126 of FIG. 2—are also sandboxed in driver VM 400 with rendering backend 200, this approach can also prevent attacks on components 122 and 126 from affecting the rest of host system 100.

In some embodiments, rather than running on the same host system as guest application 110/VM 112, driver VM 400 may run on the hypervisor of a remote host system. In these embodiments, sandbox connector 202 and sandboxed rendering backend 200 can communicate via a network-based method such as remote direct memory access (RDMA).

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory, and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device, based on either existing or subsequently developed technology, that can store data in a non-transitory state which can thereafter be input to a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
    receiving, by a hypervisor of a host system, one or more first graphics or compute commands issued by a guest application running within a virtual machine (VM) of the host system;
    communicating, by the hypervisor, the one or more first graphics or compute commands to a sandboxed software process that is separate from the hypervisor;
    translating, by the sandboxed software process, the one or more first graphics or compute commands into one or more second graphics or compute commands; and
    issuing, by the sandboxed software process, one or more second graphics or compute commands for execution on a physical graphics processing unit (GPU).

2. The method of claim 1 wherein the sandboxed software process runs on a host operating system (OS) of the host system.

3. The method of claim 2 wherein the one or more second graphics or compute commands are calls to a host graphics or compute API (application programming interface) library of the host OS.

4. The method of claim 3 wherein upon being issued, the one or more second graphics or compute commands are handled by a host GPU driver of the host system that implements the host graphics or compute API library.

5. The method of claim 1 wherein the sandboxed software process runs within another VM of the host system.

6. The method of claim 1 wherein the sandboxed software process runs within another VM of another host system.

7. The method of claim 1 wherein communicating the one or more first graphics or compute commands to the sandboxed software process comprises:
    writing the one or more first graphics or compute commands to a memory region shared by the hypervisor and the sandboxed software process; and
    transmitting, via a control channel, a signal to the sandboxed software process indicating that the memory region includes command data to be consumed.

8. A non-transitory computer readable storage medium having stored thereon instructions executable by a host system, the instructions embodying a method comprising:
    receiving, by a hypervisor of the host system, one or more first graphics or compute commands issued by a guest application running within a virtual machine (VM) of the host system;
    communicating, by the hypervisor, the one or more first graphics or compute commands to a sandboxed software process that is separate from the hypervisor;
    translating, by the sandboxed software process, the one or more first graphics or compute commands into one or more second graphics or compute commands; and
    issuing, by the sandboxed software process, one or more second graphics or compute commands for execution on a physical graphics processing unit (GPU).

9. The non-transitory computer readable storage medium of claim 8 wherein the sandboxed software process runs on a host operating system (OS) of the host system.

10. The non-transitory computer readable storage medium of claim 9 wherein the one or more second graphics or compute commands are calls to a host graphics or compute API (application programming interface) library of the host OS.

11. The non-transitory computer readable storage medium of claim 10 wherein upon being issued, the one or more second graphics or compute commands are handled by a host GPU driver of the host system that implements the host graphics or compute API library.

12. The non-transitory computer readable storage medium of claim 8 wherein the sandboxed software process runs within another VM of the host system.

13. The non-transitory computer readable storage medium of claim 8 wherein the sandboxed software process runs within another VM of another host system.

14. The non-transitory computer readable storage medium of claim 8 wherein communicating the one or more first graphics or compute commands to the sandboxed software process comprises:
- writing the one or more first graphics or compute commands to a memory region shared by the hypervisor and the sandboxed software process; and
- transmitting, via a control channel, a signal to the sandboxed software process indicating that the memory region includes command data to be consumed.

15. A host system comprising:
- a hypervisor; and
- a non-transitory computer readable medium having stored thereon instructions that, when executed by the hypervisor, causes the hypervisor to:
  - receive one or more first graphics or compute commands issued by a guest application running within a virtual machine (VM) of the host system; and
  - communicate the one or more first graphics or compute commands to a sandboxed software process that is separate from the hypervisor,
- wherein upon receiving the one or more first graphics or compute commands, the sandboxed software process translates the one or more first graphics or compute commands into one or more second graphics or compute commands and issues the one or more second graphics or compute commands for execution on a physical graphics processing unit (GPU).

16. The host system of claim 15 wherein the sandboxed software process runs on a host operating system (OS) of the host system.

17. The host system of claim 16 wherein the one or more second graphics or compute commands are calls to a host graphics or compute API (application programming interface) library of the host OS.

18. The host system of claim 17 wherein upon being issued, the one or more second graphics or compute commands are handled by a host GPU driver of the host system that implements the host graphics or compute API library.

19. The host system of claim 15 wherein the sandboxed software process runs within another VM of the host system.

20. The host system of claim 15 wherein the sandboxed software process runs within another VM of another host system.

21. The host system of claim 15 wherein the instructions that cause the hypervisor to communicate the one or more first graphics or compute commands to the sandboxed software process comprise instructions that cause the hypervisor to:
- write the one or more first graphics or compute commands to a memory region shared by the hypervisor and the sandboxed software process; and
- transmit, via a control channel, a signal to the sandboxed software process indicating that the memory region includes command data to be consumed.

* * * * *